July 15, 1941.    N. TITLESTAD    2,249,193
PROCESS FOR THE CONCENTRATION OF SULPHUR DIOXIDE
Filed Feb. 9, 1939
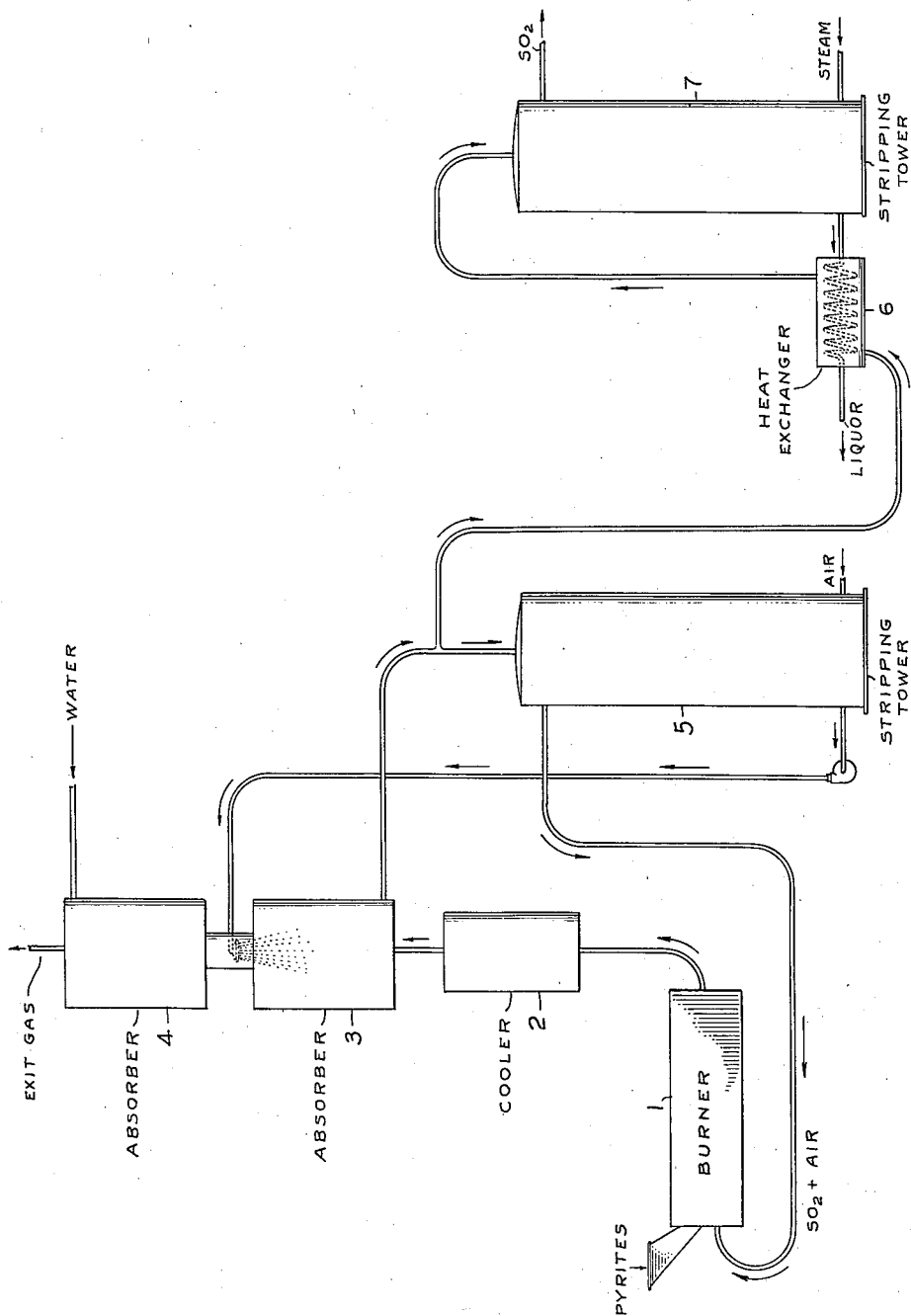
INVENTOR.
NICOLAY TITLESTAD,
BY
Walter M. O'Brien
ATTORNEY.

Patented July 15, 1941

2,249,193

UNITED STATES PATENT OFFICE 2,249,193

PROCESS FOR THE CONCENTRATION OF SULPHUR DIOXIDE

Nicolay Titlestad, White Plains, N. Y., assignor to Chemical Construction Corporation, New York, N. Y., a corporation of Delaware Application February 9, 1939, Serial No. 255,410

3 Claims. (Cl. 23—180)

This invention relates to the production of a concentrated sulphur dioxide gas from sulphur-bearing materials such as brimstone and sulphide ores.

The prior art has produced concentrated sulphur dioxide gas by burning a sulphur-bearing material such as iron pyrites and absorbing the resulting sulphur dioxide in water. In such a process, however, large quantities of water used in the absorption of the sulphur dioxide were required since pyrites burners when operated under ordinary conditions produce a gas limited to approximately 12–13% $SO_2$. Such a gas when subjected to the ordinary absorbing conditions, i. e. water at 60° F., will produce a solution containing at the most only 1–1.5% $SO_2$. In order therefore to obtain satisfactory amounts of sulphur dioxide per unit ton it was necessary to circulate large amounts of water through the absorption tower. As a result of the large amount of cool absorbing liquid thus necessary the requirements of steam to strip the cool liquid of the sulphur dioxide were also relatively large.

The purpose of the present invention is the design of a process whereby sulphur dioxide in concentrated form may be obtained from sulphur-bearing materials such as brimstone and sulphide ores and wherein the requirements of water for the absorption of the sulphur dioxide and the consumption of steam for the removal of the $SO_2$ from the absorbing liquid are reduced. The size of the heat exchanger required for the heating of the absorbing liquid prior to the steam stripping operation may also be reduced to as low as approximately ¼ the size of the preheater used in the prior art. The process which I have devised for obtaining reduction in the amount of absorbing water and consequently the amount of steam and the size of the preheater as well, comprises production of a strong sulphur dioxide gas from a sulphur-bearing material of the character described by burning of the latter in the presence of added sulphur dioxide, absorption in water of the sulphur dioxide from such a gas, division of the absorbing solution into two parts, removal of the sulphur dioxide from one of the parts thereof by passing air therethrough, passing of the sulphur dioxide-air mixture to the zone of burning of the sulphur-bearing material to provide the aforementioned added sulphur dioxide, and removal of the sulphur dioxide in the remainder of the absorbing solution by blowing steam therethrough whereby to form a concentrated sulphur dioxide gas.

In this process the primary purpose of the return of a part of the sulphur dioxide to the burning of the sulphur-bearing material is to increase the concentration of sulphur dioxide in the burner gas so that when this gas with its increased concentration of sulphur dioxide is contacted with water under absorbing conditions the higher partial pressures of sulphur dioxide will cause an increase in the efficiency of the absorption, i. e. increased amounts of sulphur dioxide will be absorbed per unit volume of water. Consequently, by carrying out the absorption in accordance with the process of the invention it is possible to effect a reduction both in the amount of water for absorption and steam for stripping of the resulting solution, per unit weight of sulphur dioxide produced from the sulphur-bearing material.

The present invention is not primarily concerned with any particular design of apparatus and it is an important advantage that it can be used with apparatus of standard design. My invention is primarily concerned with a process whereby sulphur dioxide may be more efficiently recovered in concentrated form from sulphur-bearing materials as has already been indicated.

The invention will be described in greater detail in conjunction with the drawing which illustrates in purely diagrammatic form a flow sheet of the process of a preferred modification thereof. It should be understood that the apparatus shown is purely diagrammatic and that those skilled in the art when the invention is put into practice will provide any additional apparatus deemed necessary such for example as dust purifying elements, pumps, fans and the like. A description of the operation of the process in accordance with my invention is as follows:

A burner 1 which may take the form of a rotary kiln may be supplied in any known manner with a sulphide ore such as iron pyrites. The operation of the ore burner is such as to produce low exit temperatures and low free oxygen content in the exit gas. This may be accomplished by passing a relatively concentrated sulphur dioxide gas through the kiln thus lowering the percentage of free oxygen present in the burner gas. The burner gas if it is still too hot for the subsequent absorption step may be passed to a cooler 2 which may take the form of a waste heat boiler. After the gas has been cooled down to approximately 75° F. it enters the first absorption tower 3 where it passes in countercurrent contact with a stream of water from the second absorption tower 4 and also with a stream of stripped absorbing liquor from the subsequent air stripping step. The sulphur dioxide not absorbed in tower 3 passes upwardly through a conduit connecting absorber 3 with a second absorber 4 and in its passage upwardly is contacted with a supply of liquor from the air stripping operation. Sulphur dioxide not absorbed in these two operations is then subjected to absorption with water at approximately 60° F. while passing in countercurrent contact therewith in the second absorber 4.

The solution of sulphur dioxide is then withdrawn from the absorption tower 3 and divided into two portions; one portion passing to a stripping tower 5 and the remainder passing first through a heat exchanger 6 and then into a second stripping tower 7. The portion of the sulphur dioxide solution passed to the stripping tower 5 is there subjected to a stream of air for removal of the sulphur dioxide from the solution and the resulting $SO_2$-air mixture is then passed through the pyrites kiln for the purpose of increasing the sulphur dioxide content and for maintaining the low temperatures and low free oxygen content of the exit burner gas. It also supplies at least part of the air for the combustion of the pyrites. The stripped liquor from the tower 5 is returned to the absorption tower 3, being introduced thereinto as a spray in the conduit connecting the two absorbers 3 and 4. The remaining portion of the solution from the absorber 3 which was passed into the stripping tower 7 is there stripped of sulphur dioxide by blowing steam in countercurrent contact with the downflowing solution; the concentrated sulphur dioxide being removed at the top of this stripping tower. The hot stripped liquor from this operation is passed through heat exchanger 6 to heat by indirect heat exchange solution coming from the absorber 3 and passing therethrough prior to its entrance into the stripping tower 7.

In the above description of the process the temperature of the water to be introduced into the second absorption tower 4 has been given as 60° F. The temperature of the absorbing water will of course vary, depending on the temperature of the water available in the locality of operation. The temperatures of 60° F. for absorbing water and 75° F. for the sulphur dioxide gas entering the first absorption tower are given only as an average of temperatures normally to be expected to be used. Temperatures lower and higher than these average temperatures may be used. It will be understood of course that the temperature of this absorbing water is a factor in the efficiency of the process, and that water at lower temperatures will have a greater absorbing capacity and can be used in correspondingly smaller amounts.

On an operating basis of producing 100 tons of $SO_2$ per 24 hours and assuming that water at 60° F. is available and that the stripping tower 5 is operated to supply 7200 cubic ft. per minute of air and an equal amount of $SO_2$ through the roasting kiln 1, the rich sulphur dioxide gas leaving the roaster would contain 56% $SO_2$ consisting of 50% $SO_2$ returning from the stripping tower 5 and 6% from roasting of the ore in the kiln to a 12% $SO_2$ gas. The burner gas having been cooled down to approximately 75° F. and entering the absorption tower 3 at this temperature in countercurrent contact with the stripped liquor from tower 5 and in further contercurrent contact in the absorber 4 with an amount of water at 60° F. sufficient to make up for the liquor discharged from the system at the heat exchanger 6 will produce at the bottom of the absorber 3 a solution of sulphur dioxide which has an equilibrium of approximately 5% $SO_2$.

Part of this 5% $SO_2$ liquor entering at about 75° F. into the top of the stripping tower 5 would be stripped of sulphur dioxide by passing air in countercurrent therethrough. It is not necessary that the liquor be stripped absolutely free of $SO_2$. It may contain a residual sulphur dioxide as high as ½% since 90% stripping efficiency would be sufficient and the stripped liquor would still be satisfactory for further absorption in the absorbing tower 3. The passage of the air through the liquor in tower 5 will remove therefrom the heat generated in the absorption tower 3 so that the returned liquor entering this latter absorption tower will be at the same temperature as before starting the cycle. The remainder of the solution from the absorption tower 3, corresponding to the amount of water supplied to the system, would then pass through the heat exchanger 6 in indirect heat exchange with the hot liquor from the stripping tower 7. The thus heated solution would then be subjected to a stripping operation by means of steam to produce the concentrated $SO_2$ gas.

While a specific embodiment of the invention has been above described it is to be understood that this is by way of illustration only and not of limitation of the invention, the scope of which is defined in the appended claims.

What I claim is:

1. The process of producing a concentrated sulphur dioxide gas from a sulphur-bearing material which under ordinary conditions of burning gives a gas, the sulphur dioxide content of which on absorption in water produces a solution of low sulphur dioxide concentration, which comprises, burning such a sulphur-bearing material in the presence of added sulphur dioxide from the process to produce a gas having an increased sulphur dioxide content, contacting the gas with its increased sulphur dioxide content with water under absorbing conditions to remove the sulphur dioxide therefrom, withdrawing the absorbing solution from contact with the gas and dividing it into two parts, removing the sulphur dioxide from one part thereof by passing air therethrough, passing the resulting sulphur dioxide-air mixture to the burning step to provide therein the aforementioned added sulphur dioxide, passing the liquor from this air stripping step to the absorbing step, heating the remainder of the withdrawn absorbing solution, removing the sulphur dioxide therefrom in the form of a concentrated sulphur dioxide gas by blowing steam in countercurrent therethrough, discharging the liquor from the steam stripping step from the system, and adding an amount of water in the absorption step sufficient to make up for the liquor discharged from the system.

2. The process of producing a concentrated sulphur dioxide gas which comprises burning iron pyrites in the presence of added sulphur dioxide from the process to produce a gas having an increased sulphur dioxide content, contacting the gas with its increased sulphur dioxide content with water under absorbing conditions to remove the sulphur dioxide therefrom, withdrawing the absorbing solution from contact with the gas, dividing it into two parts, removing the sulphur dioxide from one part thereof by passing air therethrough, passing the resulting sulphur dioxide-air mixture to the burning step to provide therein the aforementioned added sulphur dioxide, passing the liquor from the air stripping step to the absorbing step, heating the remainder of the absorbing solution and removing the sulphur dioxide therefrom in the form of a concentrated sulphur dioxide gas by blowing steam in countercurrent therethrough, discharging the liquor from the steam stripping step from the system, and adding an amount of water in the absorption step sufficient to make up for the liquor discharged from the system.

3. A process of producing an aqueous solution of increased sulphur dioxide content which comprises, burning a sulphur-bearing material which under ordinary conditions of burning gives a gas of low sulphur dioxide content in the presence of added sulphur dioxide from the process to produce a gas having an increased sulphur dioxide content, contacting the gas with its increased content of sulphur dioxide with water under absorbing conditions to remove the sulphur dioxide therefrom, withdrawing the absorbing solution from contact with the gas and dividing it into two parts, passing air through one part thereof to remove the sulphur dioxide therefrom, passing the sulphur dioxide-air mixture to the burning step to provide therein the aforementioned added sulphur dioxide, passing the liquor from the air stripping step to the absorption step, and adding an amount of water in the absorption step sufficient to make up for the remainder of the withdrawn absorbing solution.

NICOLAY TITLESTAD.